United States Patent
Acker

[11] 3,892,291
[45] July 1, 1975

[54] REVERSING VALVE

[75] Inventor: Peter H. Acker, Chesterland, Ohio

[73] Assignee: Eaton Corporation, Cleveland, Ohio

[22] Filed: May 3, 1974

[21] Appl. No.: 466,561

[52] U.S. Cl. .............. 184/7 E; 251/297; 137/625.6
[51] Int. Cl. .......................... F16r 7/14; F01m 1/00
[58] Field of Search .................... 184/7 D, 7 E, 7 F; 137/625.6, 625.66; 251/297; /; 128/145.8, 142.2

[56] References Cited
UNITED STATES PATENTS

| | | | |
|---|---|---|---|
| 2,376,348 | 5/1945 | Fox | 128/145.8 |
| 3,406,789 | 10/1968 | Gruber | 184/7 E |
| 3,414,085 | 12/1968 | Fujita | 184/7 D |
| 3,515,245 | 6/1970 | Obergefell et al. | 184/7 E |

Primary Examiner—Richard C. Pinkham
Assistant Examiner—William R. Browne
Attorney, Agent, or Firm—Teagno & Toddy

[57] ABSTRACT

A reversing valve assembly for controlling the flow of fluid in a dual line type of system. The assembly has a spring biased toggle mechanism of improved design to prevent centering of a piston such as the pilot piston in a reversing valve or the like. The toggle mechanism includes a slider block mounted intermediate the opposed valving ends of a reciprocating pilot piston. The slider block has a surface slidably retained on a slipper plate and a generally V shaped groove diametrically opposed the slidably retained surface extending in a direction generally transverse to the axis of the pilot piston. A spring biased throw link is received in the groove to apply toggle action for alternately applying a force to the ends of the piston and for retarding initial axial movement of the piston and accelerating final axial movement of the piston.

9 Claims, 10 Drawing Figures

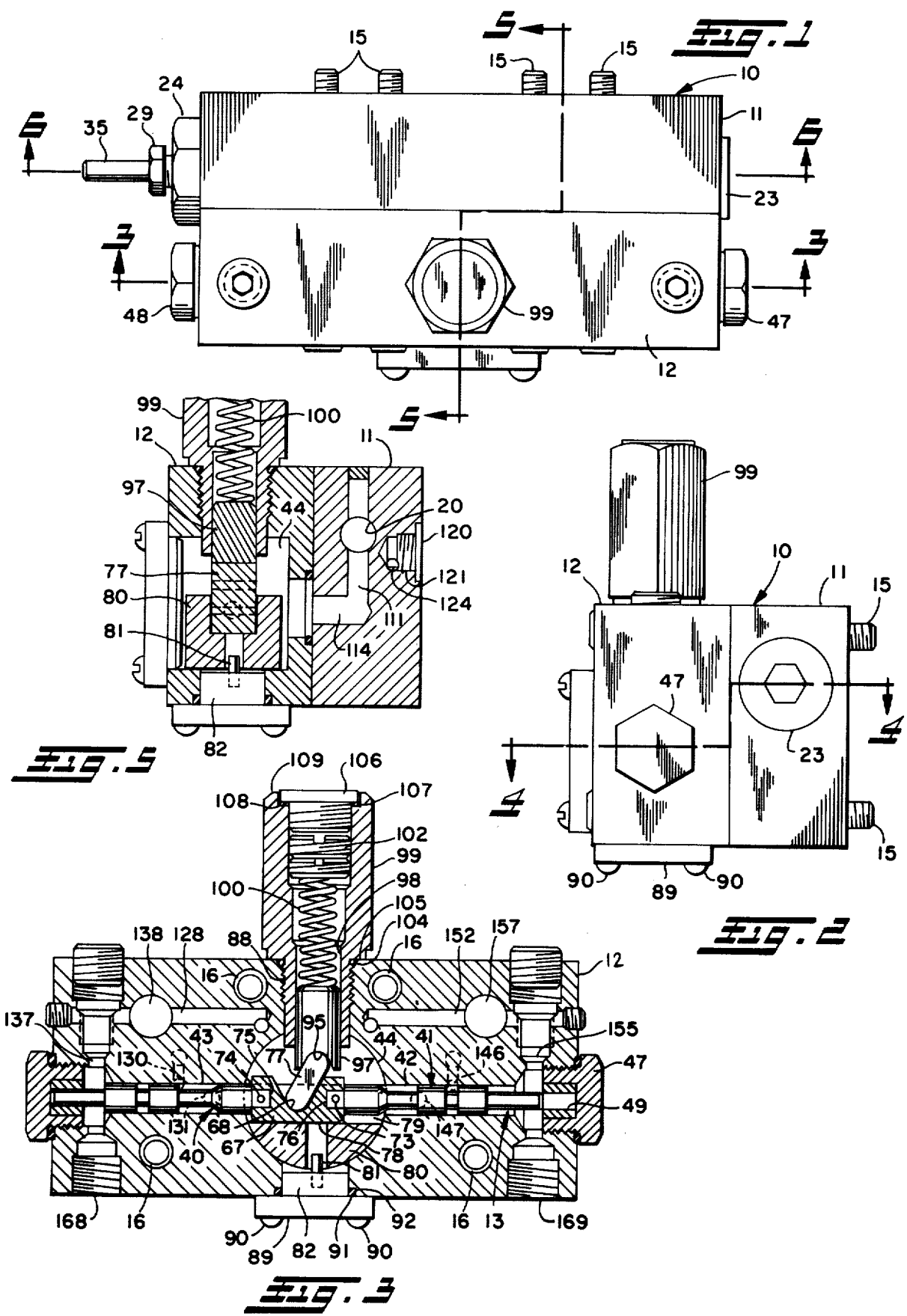

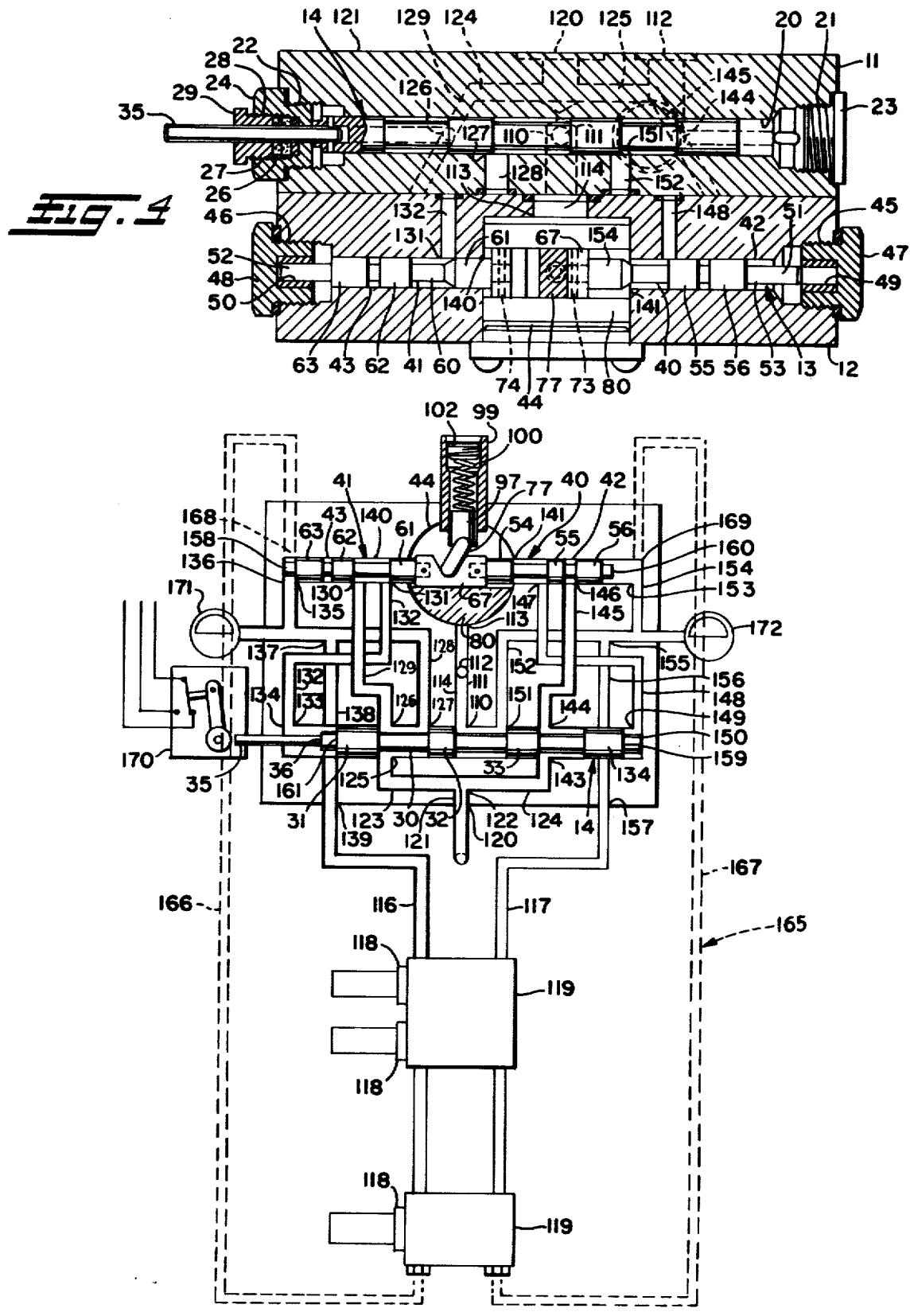

3,892,291

REVERSING VALVE

BACKGROUND OF THE INVENTION

1. Field of the Invention

This invention relates to reversing valves for controlling the flow of fluid in a dual line type of system and more particularly relates to a toggle action mechanism for preventing "centering" or "hang-up" of a reciprocating pilot piston in a reversing valve used to control the flow of lubricant in a dual line type of lubricating system.

2. Description of the Prior Art

Fluid dual line systems, such as a dual line lubricating system, essentially comprise one or more lubricating valves for metering lubricant to a part requiring such lubricant, e.g., a bearing, and a pair of feed lines or conduits leading from the various lubricating valves to a main control device or reversing valve for alternately directing the flow of the lubricant through the lines. Lubricant is pumped under pressure from a main source of supply, e.g., a reservoir, through the reversing valve and alternately fed through each conduit to the various lubricating valves for metering to the parts requiring lubricant.

The reversing valve generally consists of two operating valves or pistons, one piston known as the prime or fluid diverter piston for controlling the flow of fluid or lubricant in the pair of feed lines, and the other piston known as the secondary or pilot piston for controlling the operation of the first or fluid diverter pistion.

A problem encountered in the above briefly described dual line system is that the pilot or activating piston has a tendency to "center", that is, the pressure of the lubricant against the piston causes it to "hang-up" or become inoperative in its piston chamber. This invention solves that problem by providing a novel activating piston and improved toggle mechanism for overcoming this "centering" tendency.

Prior reversing valves have utilized toggle mechanisms which were spring biased to coact with the pilot piston for limiting movement of said piston to either a first or a second position. An excellent example of such a system may be seen by reference to U.S. Pat. No. 3,406,789 assigned to the predecessor in interest of the assignee of this application. While some systems have provided excellent solutions to the problem of "centering" or "hang-up", the structure of the toggle mechanism utilized has proven less than totally satisfactory as frequent repair or replacement of the toggle mechanism was often required.

SUMMARY OF THE INVENTION

In accordance with the present invention a reversing valve suitable for use in higher pressure systems than heretofor possible and having a relatively simple and long lasting heretofor biased toggle mechanism is used to prevent centering of spring pilot piston is provided.

Briefly stated this invention is embodied in a lubricating system having at least one pair of feeds or conduits, a primary valve responsive to fluid pressure for alternately directing the flow of lubricant through the conduits, a secondary valve initially movable under pressure generated in the conduits for producing the fluid pressure controlling the operation of the primary valve, a reservoir for storing the lubricant, and a pump for pumping the lubricant through the system. In accordance herewith, there is provided a split secondary valve or pilot piston having two spaced apart valve or piston sections movable in unison along the same axis. Means, e.g., a spring biased toggle mechanism, disposed between the sections, coacts with them for transferring force alternately applied to opposing ends of the sections and for retarding initial movement of the secondary valve and accelerating its final movement thus assuring the piston will come to rest in either a first or second position and not become hung-up therebetween.

The improved toggle mechanism of this invention includes a slider block which is interposed between the split pilot piston sections and has a relatively smooth surface which slidably rides on a conforming smooth surface of a fixed slipper plate. Diametrically opposed the smooth surface of the slider block is a generally V shaped groove extending in a direction generally transverse to the axis of reciprocation of the pilot piston. A throw link is spring biased between a pivot guide and the V shaped groove. The throw link is preferably solid and so shaped to come to rest in an equilibrium position only when resting against either one of the outwardly tapered side walls of the V shaped groove. The force necessary to overcome the initially retarding force applied by the toggle mechanism to the piston may be varied by variation of either the spring bias and/or the slope angle of the V shaped groove side walls.

In operation of the reversing valve, a pressure build up in the lubricant line acts in opposition to the spring biased toggle mechanism to reverse the pilot piston. Pilot piston movement in turn produces a reversal of the flow diverter piston thereby permitting a flow of pressurized lubricant into the alternate lubricant line.

Accordingly, an object of the present invention is to provide a new and improved reversing valve for a dual line system having a new and improved spring biased toggle mechanism to prevent centering of the pilot piston.

Another object of the present invention is to provide an improved toggle mechanism for a reversing valve which will transmit forces to the valve body by means of relatively substantial, solid members thus allowing the valve to be utilized in relatively high pressure systems.

A further object of the present invention is to provide a new and improved spring biased toggle mechanism for a pilot piston of a reversing valve which is relatively easy to produce and maintain and which comprises relatively few parts.

These and other objects and advantages of the present invention will become apparent from a reading of the description of the preferred embodiment taken in connection with the attached drawings.

BRIEF DESCRIPTION OF THE DRAWINGS

FIG. 1 is a top view of the reversing valve of this invention.

FIG. 2 is a side view of the reversing valve.

FIG. 3 is a sectional view of the reversing valve taken in the plane indicated by the line 3—3 of FIG. 1.

FIG. 4 is a sectional view of the reversing valve taken in the plane indicated by the line 4—4 of FIG. 2.

FIG. 5 is a sectional view of the reversing valve taken in the plane indicated by the line 5—5 of FIG. 1 showing only a portion of the toggle mechanism spring housing.

FIG. 7 is a diagrammatic illustration of the porting and passageway or line system used in the reversing valve, showing in particular the positions of the pistons for controlling flow of hydraulic fluid in one of the dual lines.

DESCRIPTION OF THE PREFERRED EMBODIMENT

Figure 6:
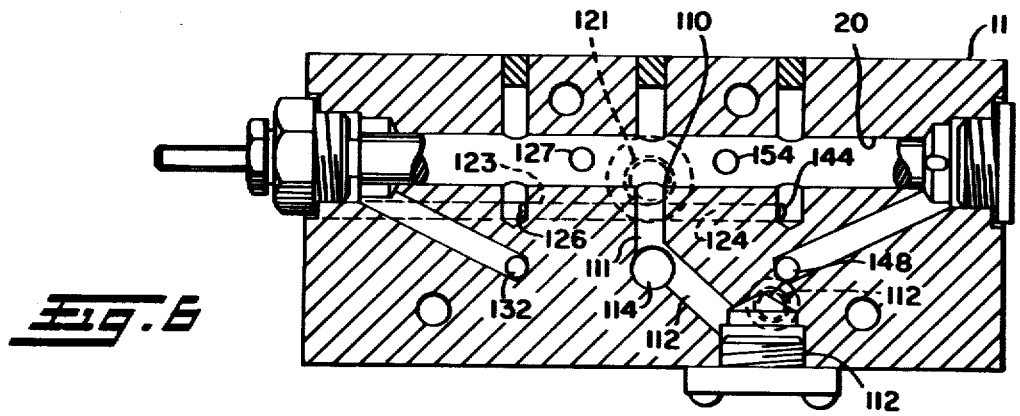
FIG. 6 is a sectional view of the reversing valve taken in the plane indicated by the line 6—6 of FIG. 1.

Referring generally to FIGS. 1–10, and more particularly to FIGS. 1 and 2, there is shown a reversing valve generally indicated at 10. The reversing valve 10 because of the numerous ports and conduits or lines, is conveniently formed from front and rear sections 12 and 11, respectively. The front section 12 will hereinafter be known as the pilot section as it contains a pilot piston or valve generally indicated at 13, and the rear section 11 will hereinafter be known as the diverter section as it contains a flow diverting piston or valve generally indicated at 14. The pilot section 12 and the diverter section 11 are secured together by any suitable means, e.g., bolts 15 suitable engaged in aligned holes 16 in the two sections.

The diverter section 11 has a piston or valve chamber 20 longitudinally extending through it. The flow diverter piston 14 reciprocates within the piston chamber 20. The open ends 21 and 22 of the piston chamber 20 are enlarged and threaded to receive diverter plugs 23 and 24, respectively. The plugs 23 and 24 are provided to seal the open ends 21 and 22, respectively, of the piston chamber 20.

The flow diverter piston or valve 14 comprises an elongated cylindrical valve stem or piston rod 30 having a plurality of concentrically disposed lands or piston head 31, 32, 33 and 34 spaced along the rod 30 in port closing and opening relation to the various ports communicating with the piston chaamber 20. (FIGS. 4, 5 and 7).

An elongated stem 35 is secured to the piston rod end 36 by any suitable means. A plurality of successively larger openings or bores 25, 26 and 27 are centrally disposed in the diverter plug 24. The stem 35 extends through and reciprocates in the aforesaid bores 25, 26 and 27. The stem 35 is provided as a safety device to visually check the operation of the flow diverter piston 14. Hydraulic fluid is kept from flowing through the diverter plug 24 by a pliable annular sealing gasket 28 disposed in the plug bore 26 and surrounding the stem 35. The seal 28 is held in position by a screw plug 29 surrounding the stem 35 and threadably engaged in the plug bore 27. The other diverter plug 23 has a centrally disposed opening adjacent to the piston chamber 20. The flow diverting valve or piston 14 reciprocates within the piston chamber 20 between diverter plugs 23 and 24. The flow diverting piston 14 controls the flow of hydraulic fluid from the reversing valve 10. The flow diverting valve or piston 14 is activated or caused to move by fluid pressure produced by movement of the pilot piston 13 in the pilot section 12.

The pilot piston 13 is a split piston, that is, it comprises a pair of axially spaced apart pistons or valve sections 40 and 41. Pistons 40 and 41 reciprocate in unison in spaced apart axially aligned piston bores or chambers 42 and 43, respectively. The piston chambers 42 and 43 communicate with and radiate from an enlarged toggle chamber 44. The longitudinal axis of the axially aligned bores 42 and 43 is, preferably, parallel to the longitudinal axis of the flow diverter piston chamber 20. The open ends 45 and 46 of piston chambers 42 and 43, respectively, are enlarged and threaded to receive pilot plugs 47 and 48, respectively. The plugs 47 and 48 are used to seal the open ends of the piston chambers 42 and 43, respectively. Centrally disposed openings 49 and 50, respectively, extend into the plugs 47 and 48 adjacent the piston chambers 42 and 43, respectively. The openings 49 and 50 are designed to receive piston rod ends 51 and 52, respectively, of pistons 40 and 41, respectively, as they reciprocate.

The pilot piston section 40 comprises a piston rod or valve stem 53 having a plurality of concentrically disposed lands or piston heads 54, 55 and 56 spaced along the rod 53 in port closing and opening relationship to the numerous ports communicating with its piston on valve chamber 42.

The pilot piston section 41 comprises a piston rod or valve stem 60 having a plurality of concentrically disposed land or piston heads 61, 62 and 63 spaced along the rod 60 in port opening and closing relation to the various ports communicating with its piston or valve chamber 43.

A spring biased toggle mechanism generally indicated at 64 is mounted within the enlarged chamber 44 between the piston rod ends 65 and 66 of pistons 40 and 41, respectively, and coacts with the pistons 40 and 41 to retard their initial axial movement, and to accelerate their final axial movement. Toggle mechanism 64 comprises a slider block 67 having a generally "V" shaped slot 68 extending through it, the longitudinal axis of the slot 68 being transverse to the axis along which the pilot piston reciprocally moves. The slider block 67 has a pair of spaced apart axially aligned bores 71 and 72 which are at right angles to the slot 68. It is noted that bores 71 and 72 may be formed as a single through bore passing through the "V" shaped slot 68. The rod ends 65 and 66 of pistons 40 and 41, respectively, are inserted and secured in the bores 71 and 72, respectively, by any suitable means, e.g., pins 73 and 74, respectively. When secured to the slider block 67, the confronting rod extremities 75 and 76 of rod ends 65 and 66, respectively, are in spaced apart relation with the "V" shaped slot 68 interposed the two.

A throw link 77 is insertable in the generally "V" shaped slot 68 and coacts with the rod extremities 75 and 76 of the piston sections 40 and 41, respectively. The slider block 67 has a generally smooth surface 78 which is slidably supported by a generally smooth, conforming surface 79 of slipper plate 80. Surface 79 is the bottom of an axially extending groove 79' which limits slipper block 67 movement relative to slipper plate 80 to reciprocal movement along the axis of the groove. Slipper plate 80 may be retained fixed in the pilot section housing by means of pin 81 which is formed integrally with cap 82 or may be retained by the compressive forces exerted thereon by spring 100.

A pair of axially aligned bores 87 and 88 are formed in the pilot section 12. The longitudinal axis of the bores 87 and 88 are at right angles to the longitudinal axis of the pilot piston chambers 42 and 43. The bores 87 and 88 communicate with the enlarged chamber 44. The piston chambers 42 and 43 and the bores 87 and 88 radiate from the toggle chamber 44. A fixed toggle mounting 89 is secured within the bore 87 by any suitable means, e.g., screws 90. A pliable sealing ring 91 coacts between the cap 82 and an adjacent chamferred edge 92 of the bore 87 for keeping hydraulic fluid.

The end of the throw link 77 opposite that received in slot 68 is mounted in a complementary configured generally "V" shaped slot 95 formed in an adjacent edge 96 of a spring biased movable pivot guide or mounting 97. The pivot guide 97 is slidably mounted within the bore 98 of an adapter housing 99, which is threadably secured in the pilot section bore 88. The pivot guide 97 is spring biased in a direction towards the slipper plate 80 by any suitable means, e.g., a helix spring 100 disposed within the bore 98 and coacting between the guide end 101 and an adjustable plug 102 which is threadably engaged within the bore 98. Configured generally V shaped slot 95 is movable to and from the slipper plate 80 a plane passing through the center of the slot 95, the plane being normal to the axes of the piston chambers 42 and 43. The plug 102 compresses the spring 100 as it is threadably moved farther into the bore 98. Thus, the spring 100 is tensioned to produce more or less force against the pivot guide 97. The spring biased pivot guide 97 coacts with the fixed slipper plate 80 to exert compressive force against the free ends of the throw link 77, which force varies as the pivot guide 97 moves to and from the fixed slipper plate 80. In this manner, the initial movement of the throw link 77 is retarded, and its final movement accelerated. A centrally disposed passageway 103 extends through the pivot guide 97. The passageway 103 is provided to equalize the hydraulic fluid pressure on the pivot guide 97, and to lubricate the sides of the adapter bore 98. The throw link 77 should be angularly disposed to the sliding surfaces 78 and 79 in its respective positions. The force to initially move the piston sections 40 and 41, is in proportion to this angular disposition. This angle or disposition is largely controlled by the slope of the configured sides, e.g., 68' and 68'', of the slot 68. Sides 68' and 68'' provides safety means limiting the rotation or pivot of throw link 77. The adapter housing 99 sealingly coacts with a pliable sealing ring 104 lying against an adjacent chamferred edge 105 of the bore 88. It has been found that the toggle mechanism 64 of the present invention is relatively easy to manufacture and assemble as only four parts are required; i.e., a slider block, a slipper plate, a throw link and a pivot guide, to replace the four links, three pivot pins, the stationary mount and the movable mount previously required for the prior art pivot link type of toggle mechanisms. The elimination of pivot links and pivot pins has also provided a much more reliable and easier to maintain assembly.

It may also be seen that the toggle mechanism of the present invention is comprised of relatively solid and substantial members as compared to the toggle links and pivot pins of the prior art. These relatively substantial members transmit forces directly to the valve body under a compressive force and thus allow the valve to be utilized in higher pressure systems than heretofor possible. By way of example, reversing valves, such as seen in U.S. Pat No. 3,406,789, are recommended for use in high frequency systems having a pressure of no more than 600 PSI while tests on similar valves utilizing the present toggle structure have shown reliability in high frequency systems wherein the pressures are at, or around, 4,000 PSI.

A cap screw 106 for sealing the adapter bore 98 is threaded into the bore 98 behind the adjustable plug 102. The plug 106 exerts pressure against an annular sealing ring 107 lying in an annular recess 108 formed in the adapter housing end 109.

Figure 8:
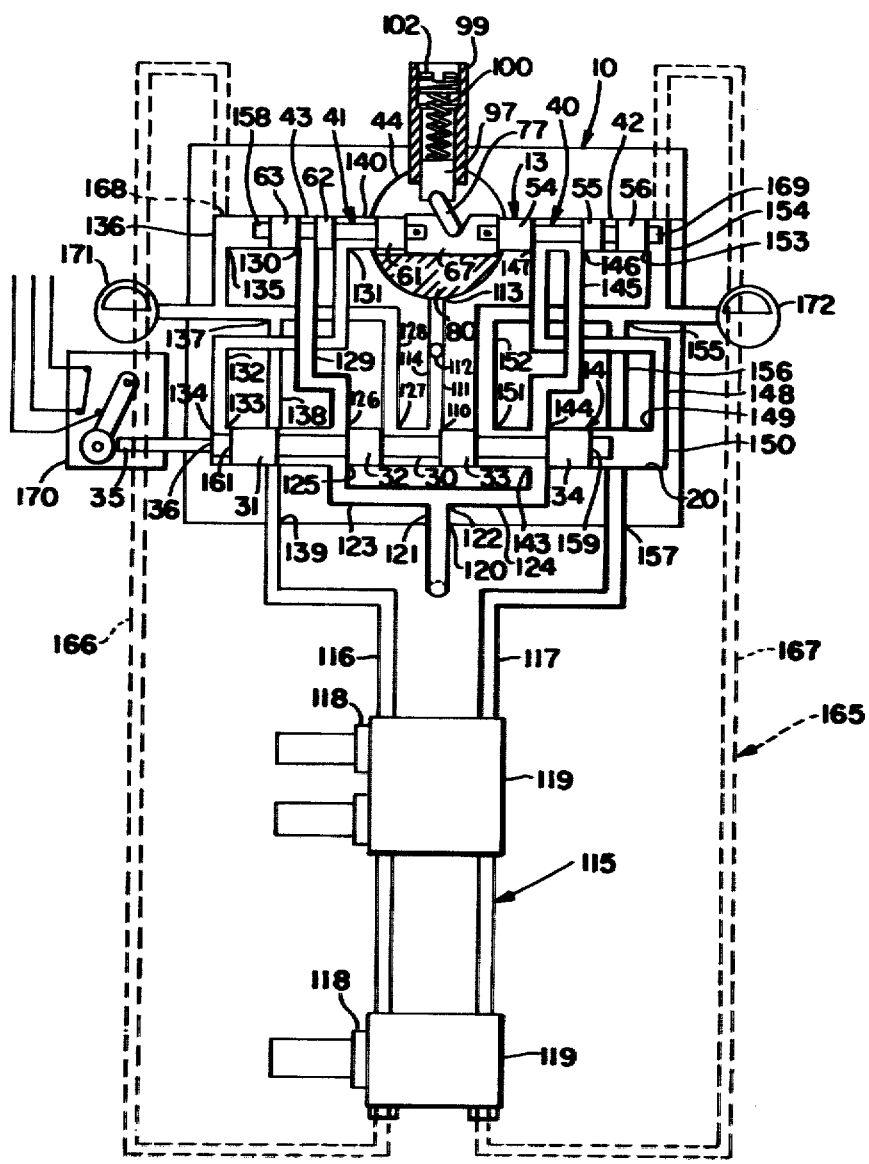
FIG. 8 is a diagrammatic illustration of the porting and passageway system in the reversing valve, showing in particular the position of the pistons for controlling the flow of hydraulic fluid to the other of the dual lines.
Figure 9:
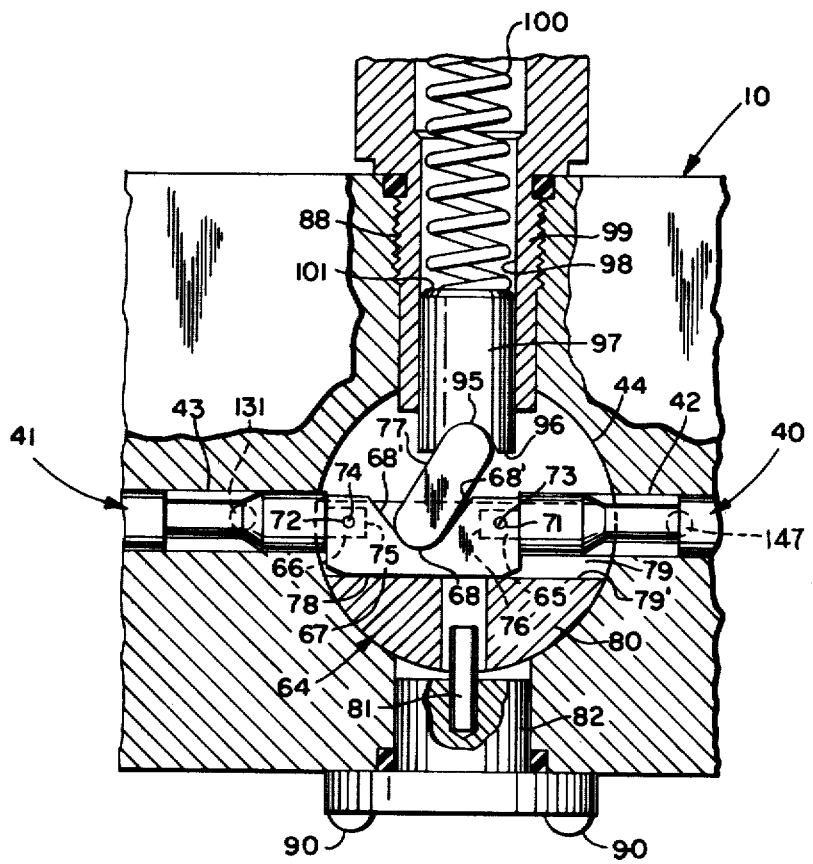
FIG. 9 is a detailed section of the toggle mechanism of the present invention.
Figure 10:
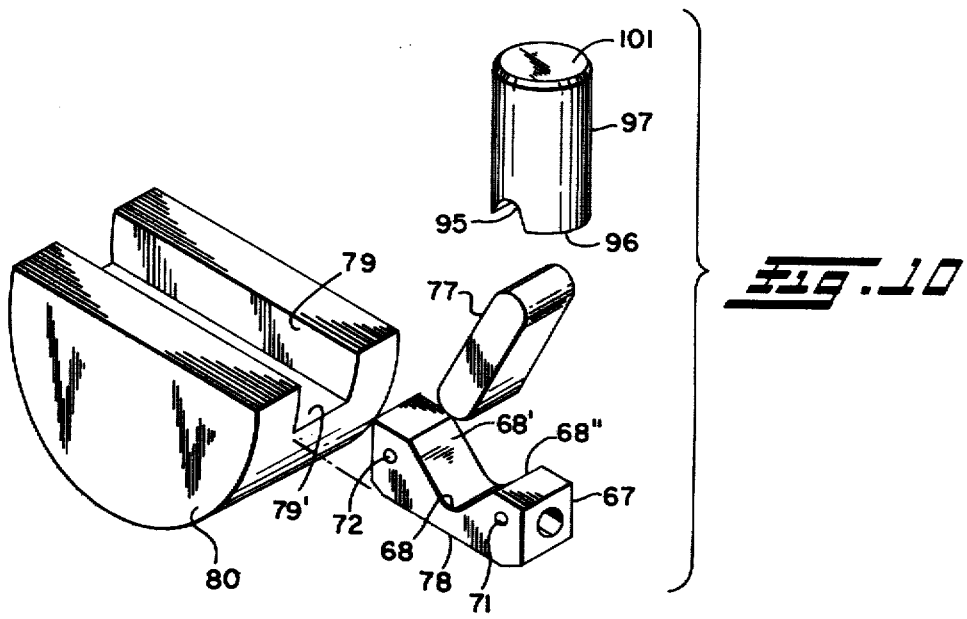
FIG. 10 is an exploded view of the toggle mechanism of the present invention showing the component parts thereof.

Referring more particularly to FIGS. 7 and 8, there is shown a dual line system generally indicated at 115. In such a system, the hydraulic fluid is pumped from a source of fluid supply, e.g., a fluid reservoir, (not shown) into a reversing valve 10. The reversing valve alternately directs the flow of hydraulic fluid through a pair of lines or conduits 116 and 117 leading to a conventionally designed dual line valve, e.g., valve 118, or a plurality of such valves grouped together as indicated at 119. The valves 118 in turn meter lubricant or hydraulic fluid to the parts requiring such lubricant. The interrupted flow of lubricant to the various parts is caused by reciprocating valves or pistons within the conventionally designed dual line valves 118. Such valving action alternately causes back pressure in lines 116 and 117 which forces the pilot pistons 40 and 41 to reciprocate in their respective chambers 42 and 43. The toggle mechanism 64 coacts with the pilot piston 13 to keep it reciprocating within the bore and preventing it from "centering", that is hanging up within the bore and not moving in either direction. The pilot piston 13 as it moves produces fluid pressure which activates the flow diverter piston 14, which alternately directs lubricant or hydraulic fluid to the lines or conduits 116 and 117. The cycle is constantly repeated and spurts of lubricant are fed to the parts requiring it.

PORTING AND CONDUIT SYSTEM

Lubricant or hydraulic fluid is continuously pumped from a source of supply, e.g., a reservoir (not shown), to an inlet port 120 in the reversing valve 10. The inlet port 120 communicates with a main supply line or passageway 121 leading to and communicating with port 122. The main supply passageway 121 branches into a primary supply line 123 and a secondary supply line 124 both of which communicate with port 122. The primary supply line 123 and the secondary supply line 124 are pressurized, i.e., always containing fluid under pressure. Primary supply line 123 communicates with port 125 in the flow diverter piston chamber 20. Port 125 is always open to piston chamber 20 between the piston lands 31 and 32.

PRIMARY AND SECONDARY FEED LINES FROM THE PRIMARY SUPPLY LINE 123

A pair of spaced apart ports 126 and 127 in chamber 20 communicates with port 125. Port 126 is always open to port 125 between piston lands 31 and 32, and is, therefore, always pressurized. Port 127 is alternately pressurized and depressurized, that is, port 127 alternately communicates with pressurized port 125, and a continuously depressurized port 110 communicating with drainage passageway 111 which communicates with the drainage outlet or port 112 in communication with the reservoir (not shown). The piston land 32 alternately opens and closes the depressurized port 110 to the port 127 as the flow diverter piston 14 reciprocates. The primary supply line 123 is divided into a primary feed line 128 communicating with port 127, and a secondary feed line 129 communicating with port 126.

SECONDARY FEED LINE 129 FROM PRIMARY SUPPLY LINE 123

The secondary feed line 129 communicates with port 130 in the pilot piston chamber 43. The secondary feed line 129 and port 130 are always pressurized. The port 130 alternately communicates with piston chamber 43 between the piston lands 61 and 62 and piston lands 62 and 63 of the pilot piston section 41. The port 130 alternately communicates with port 131 in the piston chamber 43 adjacent port 130. The port 131 is alternately pressurized and depressurized by the reciprocating piston land 61, i.e., port 131, alternately communicates with pressurized port 130 between piston lands 61 and 62. And depressurized port 140 communicates with the toggle chamber 44 which is always depressurized since it is open to drainage passageway 114 communicating with the drainage port 112 leading to the reservoir (not shown) through port 113 in the chamber 44. The port 131 communicates with line 132 communicating with port 133 in one end 134 of the flow diverter piston chamber 20. The line 132 is alternately pressurized and depressurized.

PRIMARY FEED LINE 128 FROM PRIMARY SUPPLY LINE 123

The primary feed line 128 communicates with port 135 in the end 136 of the pilot piston chamber 43. The primary feed line 128 is alternately pressurized and depressurized. A port 137 in the primary feed line 128 intermediate ports 127 and 135, communicates with primary outlet line 138 which communicates with a primary outlet port 139. One of the dual lines, e.g., line 116, of the dual line system is attached to and communicates with the primary outlet port 139.

PRIMARY AND SECONDARY FEED LINES FROM THE SECONDARY SUPPLY LINE 124

As previously indicated, the secondary main supply line 124 communicates with the main supply line 121 through port 122. The secondary supply line 124 communicates with port 143 in the flow diverter piston chamber 20. Port 143 is always open to piston chamber 20 between piston lands 33 and 34. The port 143 communicates with spaced apart ports 144 and 151 in the valve chamber 20. The port 144 is always open to port 143 between piston lands 33 and 34, and is, therefore, always pressurized. Port 151 is alternately pressurized and depressurized, that is, port 151 alternately communicates with port 143 and depressurized port 110 (previously described). The piston land 33 alternately opens and closes the depressurized port 110 to the port 151 as the flow diverter piston 14 reciprocates. The secondary supply line 124 is also divided into a primary secondary feed line 152 communicating with port 151, and a secondary feed line 145 communicating with port 144.

SECONDARY FEED LINE 145 FROM SECONDARY SUPPLY LINE 124

The secondary feed line 145 communicates with port 146 in the pilot piston chamber 42. The port 146 alternately communicates with chamber 42 between piston lands 54 and 55 and piston lands 55 and 56 of the pilot piston section 40. The secondary feed line 145 and port 146 are always pressurized. The port 146 alternately communicates with port 147 in the piston chamber 42 adjacent port 146. The port 147 is alternately pressurized and depressurized by the reciprocating piston land 54, i.e., port 147 alternately communicates with pressurized port 146 between piston lands 54 and 55, and depressurized port 141 communicating with the depressurized toggle chamber 44 (previously described). The port 147 communicates with line 148 communicating with port 149 disposed in the other end 150 of piston chamber 20. The line 148 is alternately pressurized and depressurized.

PRIMARY FEED LINE 152 FROM SECONDARY SUPPLY LINE 124

The primary feed line 152 communicates with port 153 in the end 154 of pilot piston chamber 42. The primary feed line 152 is alternately pressurized and depressurized. A port 155 in the primary feed line 152 intermediate ports 151 and 153, communicates with secondary outlet line 156 which communicates with a secondary outlet port 157. The other of said dual lines, e.g., line 117, is attached to and communicates with the secondary outlet port 157.

DEPRESSURIZED SYSTEM

As previously indicated, the toggle chamber 44 and port 110 are always depressurized. The port 110 communicates with drainage line 111 communicating with the drainage port 112. A depressurized port 113 in the toggle chamber 44 communicates with drainage line 114 also communicating with the drainage port 112. A line (not shown) from the reservoir (not shown) is attached to and communicates with the drainage port 112. The lubricant or hydraulic fluid is continuously pumped into the reversing valve 10 through the inlet port 120, and continuously drained from the reversing valve 10 through the drainage port 112.

OPERATION

Assuming the flow diverter piston 14 and the pilot piston 13 is to be in the positions shown in the FIG. 7, the pump operates to pump lubricant or hydraulic fluid from the reservoir into the inlet port 120 through the main supply line 121, and into the primary and secondary supply lines 123 and 124, respectively. The lubricant is pumped from the secondary supply line 124 into the piston chamber 20 between lands 33 and 34, through the port 144 into the secondary feed line 145, and into the piston chamber 42 between piston lands 55 and 56.

The lubricant is also pumped from the primary supply line 123 into the piston chamber 30 between piston lands 31 and 32, and into the primary and secondary feed lines 128 and 129. The lubricant is pumped through the secondary feed line 129 into the piston chamber 43 between the piston lands 61 and 62, into the line 132, and into the end 134 of piston chamber 20. Simultaneously, the lubricant is pumped through the primary feed line 128, into the end 136 of piston chamber 43. Lubricant in line 128 is also pumped into the outlet passageway 138, through the outlet port 139 and into one of the dual lines, e.g., line 116.

The other dual line, e.g., line 117, is in communication with the drainage port 112 and is depressurized. The pressurized lines in FIGS. 7 and 8 are more heavily outlined and can be traced more readily. Because of the manner in which the dual line valves 118 operate, back pressure is built up in the line 116. This back pressure exerts a force against the surface 158 of piston land 63 and moves the pilot piston section 41 in a direction towards the toggle chamber 44. The force applied to the piston end 158 is transferred through the toggle 77 to the other pilot piston section 40 moving it in unison toward the piston chamber end 154. The toggle mechanism 64 retards initial movement of the pilot piston 13, but accelerates its final movement towards the chamber end 154.

The pilot piston 13 moves to its position seen in FIG. 8. In moving to this position two things happen. First, the end 134 of the flow diverter piston chamber 20 is depressurized by the piston land 61 moving into the toggle chamber 44 opening the toggle chamber port 140, and the piston land 62 moving to close the pressurized port 130. The line 132 communicating with the chamber end 134 is now in communication with the toggle chamber 44 and depressurized. Secondly, the piston land 54 moves to close the toggle chamber port 141 and pressurize the lubricant in line 148 leading to the other end 150 of the fluid diverter piston chamber 20. Thus, force is exerted against the surface 159 of piston land 34 causing the flow diverter piston 14 to move towards the opposing chamber end 134 (FIG. 8). When the flow diverter piston 14 is in this position, the piston land 32 blocks off the port 127 from the pressurized port 125 and opens the port 127 to the depressurized port 110 which communicates with the drainage line 111 leading to the drainage port 112. As the dual line 116 communicates with the port 127, it becomes depressurized.

This piston land 33 moves to block the port 155 from the depressurized port 110. The piston land 33 moves to block the port 151 from the depressurized port 110 and to open the port 151 to the pressurized port 143. Lubricant is then pumped from the secondary supply line 124 into the primary feed line 152, and out through the discharge port 157 into the other dual line 117. Lubricant will be pumped through dual line 117 until back pressure builds up in this line causing force to be exerted against the surface 160 of piston land 56 causing it to move towards the toggle chamber 44. Once again the toggle mechanism 64 retards the initial movement of the pilot piston 13 and accelerates its final movement towards the chamber end 136 (FIG. 7). Similarly, line 148 leading to the end 150 of flow diverter piston chamber 20 is depressurized, and the lubricant in line 132 is pressurized applying a force against the surface 161 of piston land 31 moving it back towards the piston chamber end 150. The cycle is repeated as back pressure builds up in dual line 116. In this manner the pilot piston 13 and the fluid diverter piston 14 reciprocates in their respective chambers and lubricant is alternately directed through dual lines 116 and 117 to the conventionally designed dual line valve 118.

The dual line system 115 is known as an end-of-the-line system and may be converted into a loop system generally indicated at 165. This is accomplished by using return lines 166 and 167 which are a continuation of dual lines 116 and 117, respectively. The return lines 166 and 167 are secured to and communicate with the last dual line valve in the lines 116 and 117. The lines 166 and 167 are returned to the reversing valve 10 and communicate with return inlet ports 168 and 169, respectively, in the ends 136 and 154, respectively, of pilot piston chambers 42 and 43, respectively. Resistance in the dual lines, e.g., lines 116 and 117, may be decreased by providing the return lines 166 and 167. For example, where the dual lines 116 and 117 are relatively long compared to return lines 166 and 167, respectively, there would be greater pressure loss in the lines 116 and 117 because of their greater length. Where such pressure loss is undesirable, the loop system 165 may be used.

As previously indicated, a stem 35 may be provided on the flow diverter piston rod end 36. The stem 35 extends from the piston chamber 20, and acts as a visual safety device for checking the operation of the flow diverter piston 14. In certain installations, it may be desirable to provide a limit switch 170 which coacts with the stem 35 as it reciprocates to stop the pump giving the depressurized lines time to drain. Also, depending on the installation pressure gauges 171 and 172 may be provided in primary feed lines 128, and 152, respectively, of the primary supply line 123 and secondary supply line 124, respectively, for checking the fluid pressure in the respective dual lines.

Thus, there has been provided a reversing valve having a pilot piston for actuating the flow diverting piston, which directs fluid alternately into a pair of lines or conduits. The pilot piston provided is split, being composed of a pair of axially aligned spaced apart piston sections which are kept from "centering" within their respective piston chambers by a new and novel spring biased toggle mechanism.

I claim:

1. In a pressurized fluid system including at least one pair of conduits, a primary valve for directing the flow of pressurized fluid alternately to the conduits and a secondary valve for activating the primary valve, the secondary valve including a pair of spaced apart pistons reciprocally movable in unison along the same axis, the improvement comprising:

a toggle mechanism disposed between the pistons and coacting with them for retarding their initial movement and accelerating their final movement, the toggle mechanism comprising:

a slider block interposed between the pistons and attached for axial movement in unison therewith, said slider block having a generally V shaped groove running transverse the axis of the pistons on one side thereof and a generally smooth surface radially opposite the groove, said smooth surface extending in a direction generally parallel the axis of the pistons;

a fixed slipper plate having a slideway for receiving the smooth surface and slidably supporting the slider block;

a guide block having a generally V shaped groove therein facing the V shaped groove in the slider block, said guide block being reciprocal towards and away from said slipper plate;

a throw link having one end thereof pivotally received in each generally V shaped groove; and biasing means for biasing said guide block towards said slipper plate to apply a compression force on the ends of the throw link.

2. The device of claim 1 wherein said slideway comprises a slot running parallel to the axis of the pistons to limit movement of said block to reciprocal movement parallel to the axis of the pistons.

3. The device of claim 1 wherein said biasing means is a compressed spring acting on said guide block.

4. The device of claim 3 wherein the force necessary to initially overcome the compressive force on the pistons is variable by varying the angle of the side walls of the V shaped groove wih respect to a plane normal to the axis of the pistons.

5. The device of claim 3 wherein said fluid system is a pressurized dual line lubrication system.

6. In a pressurized lubrication system including a source of pressurized lubricant, at least one pair of conduits leading to lubricant distributors, and a reversing valve including a primary valve for directing the flow of pressurized lubricant alternately to the conduits and a secondary valve for activating the primary valve, the secondary valve including a pair of spaced apart pistons reciprocally movable in unison along the same axis, the improvement comprising:

a toggle mechanism disposed between the pistons and operatively attached thereto for axial movement in unison with the pistons, said toggle mechanism coacting with the pistons for retarding the pistons initial movements and accelerating the pistons final movement, the toggle mechanism comprising:

a slider block interposed between the pistons and attached for axial movement in unison with the pistons, said slider block having a first generally V shaped groove running transverse the axis of the pistons and a generally smooth first surface radially opposite the first groove, said first surface extending in a direction parallel to the axis of the pistons;

a fixed slipper plate mounted to said reversing valve, said slipper plate having an axially extending groove for receiving said slider block, the bottom surface of said axially extending groove being generally smooth and corresponding in shape to said first smooth surface for sliding receipt of same and the side walls of said axially extending groove coacting with the slider block to prevent rotational movement of said slider block;

a guide block having a second generally V shaped groove therein, said second V shaped groove being in spaced apart concave opening relation with said first U shaped groove;

a throw link interposed said guide block and said slider block, said throw link having one end pivotally mounted in said first V shaped groove and the opposite end pivotally mounted in said second V shaped groove; and biasing means for biasing said guide block towards said slipper plate to apply a compressive force on the opposite ends of said throw link.

7. The device of claim 6 wherein said throw link is a solid member and said guide block is reciprocal towards and away from slipper plate along an axis perpendicular to the axis of said pistons and passing through said second generally V shaped groove.

8. The device of claim 6 wherein said biasing means is a compressed spring.

9. The device of claim 7 wherein said at least one of said V shaped grooves includes a depressed portion extending parallel to the axis of the pistons to retain said throw link in proper alignment with said slider and guide blocks.

* * * * *

UNITED STATES PATENT AND TRADEMARK OFFICE
CERTIFICATE OF CORRECTION

PATENT NO. : 3,892,291
DATED : July 1, 1975
INVENTOR(S) : Peter H. Acker

It is certified that error appears in the above-identified patent and that said Letters Patent are hereby corrected as shown below:

Col. 1, line 57: There should be Quotes around the words "centering".

Col. 5, line 57: There should be Quotes around the words "pivot link".

Col. 12, line 12: After "opening" insert ---- --to-concave opening----.

line 13: "U" should read "V".

Signed and Sealed this thirtieth Day of September 1975

[SEAL]

Attest:

RUTH C. MASON
Attesting Officer

C. MARSHALL DANN
Commissioner of Patents and Trademarks